(12) United States Patent
Chia (10) Patent No.: US 10,767,825 B2
(45) Date of Patent: Sep. 8, 2020

(54) POLE

(71) Applicant: PHOTIZO GLOBAL PTE LTD, Singapore (SG)

(72) Inventor: Ho Meng Chia, Singapore (SG)

(73) Assignee: PHOTIZO GLOBAL PTE LTD, Singapore (SG)

( * ) Notice: Subject to any disclaimer, the term of this patent is extended or adjusted under 35 U.S.C. 154(b) by 402 days.

(21) Appl. No.: 15/749,861

(22) PCT Filed: Aug. 31, 2017

(86) PCT No.: PCT/SG2017/050433
§ 371 (c)(1),
(2) Date: Feb. 2, 2018

(87) PCT Pub. No.: WO2018/231147
PCT Pub. Date: Dec. 20, 2018

(65) Prior Publication Data
US 2020/0103085 A1 Apr. 2, 2020

Related U.S. Application Data

(63) Continuation of application No. PCT/SG2017/050433, filed on Aug. 31, 2017, and a
(Continued)

(51) Int. Cl.
*F21S 8/08* (2006.01)
*E04H 12/02* (2006.01)
(Continued)

(52) U.S. Cl.
CPC .............. *F21S 8/085* (2013.01); *E04H 12/02* (2013.01); *H02G 3/0493* (2013.01); *F21W 2131/103* (2013.01)

(58) Field of Classification Search
CPC ....... F21S 8/085; H02G 3/0493; E04H 17/20; E04H 12/02
(Continued)

(56) References Cited

U.S. PATENT DOCUMENTS 3,512,819 A * 5/1970 Gillingwater ......... E04B 1/6158
52/461
4,429,497 A * 2/1984 Dibernardi ............... F16L 3/04
248/65
(Continued)

FOREIGN PATENT DOCUMENTS

GB 2396181 A 6/2004
WO 2007018962 A2 2/2007

OTHER PUBLICATIONS

Foreign Communication From a Related Counterpart Application, International Search Report and Written Opinion dated Dec. 14, 2017, International Application No. PCT/SG2017/050433 filed on Aug. 31, 2017.

*Primary Examiner* — Paola Agudelo (57) ABSTRACT

A pole for supporting at least one light fixture and at least one information and communication device thereon, the pole comprising: an elongate structural core to support weight of the pole; and an elongate external covering housing at least an upper portion of the structural core therein; the structural core defining a plural number of channels within the external covering to separate electrical wiring provided in each of the number channels.

17 Claims, 9 Drawing Sheets

Related U.S. Application Data continuation-in-part of application No. PCT/SG2017/050301, filed on Jun. 14, 2017, which is a continuation-in-part of application No. PCT/SG2017/050301, filed on Jun. 14, 2017.

(51) Int. Cl.
 *H02G 3/04* (2006.01)
 *F21W 131/103* (2006.01)

(58) Field of Classification Search
 USPC ........................................... 256/13.1
 See application file for complete search history.

(56) References Cited

U.S. PATENT DOCUMENTS

| | | | | |
|---|---|---|---|---|
| 4,991,823 A * | 2/1991 | Stanish, Jr. | ............ | E04H 17/14 256/1 |
| 5,568,909 A * | 10/1996 | Timko | ................ | E04H 12/2261 248/519 |
| 5,632,464 A * | 5/1997 | Aberle | ................ | E04H 12/2269 248/530 |
| 6,330,998 B1 * | 12/2001 | Roy | ........................ | E04H 17/12 256/19 |
| 6,439,744 B1 * | 8/2002 | Chanslor | ................... | F21S 6/001 248/511 |
| 6,467,756 B1 * | 10/2002 | Elsasser | ............. | E04H 12/2215 248/156 |
| 6,712,330 B1 * | 3/2004 | Damiano | ............ | E04H 12/2261 248/519 |
| 6,912,408 B1 | 6/2005 | O'Neill et al. | | |
| 7,500,654 B2 * | 3/2009 | Rosaen | ............... | E04H 12/2215 248/545 |
| 8,402,717 B1 | 3/2013 | Randazzo | | |
| 8,919,742 B2 * | 12/2014 | Williams, Sr. | .......... | E04H 17/16 256/65.11 |
| 2002/0171074 A1 * | 11/2002 | Imai | ....................... | E01F 9/623 256/13.1 |
| 2005/0166485 A1 | 8/2005 | Sugimoto et al. | | |
| 2005/0211968 A1 * | 9/2005 | Egan | ....................... | E04H 17/20 256/32 |
| 2007/0247859 A1 | 10/2007 | Haddad et al. | | |
| 2008/0149786 A1 * | 6/2008 | Bradley | ................... | F16B 9/02 248/121 |
| 2008/0149791 A1 * | 6/2008 | Bradley | ................... | F16B 9/02 248/220.21 |
| 2009/0040750 A1 | 2/2009 | Myer | | |
| 2015/0070916 A1 | 3/2015 | Al-Asfour | | |

\* cited by examiner

POLE

CROSS-REFERENCE TO RELATED APPLICATIONS

The present application claims priority to International Application No. PCT/SG2017/050301 filed with Intellectual Property Office of Singapore on Jun. 14, 2017 and International Application No. PCT/SG2017/050433 filed with the Intellectual Property Office of Singapore on Aug. 31, 2017 and entitled "POLE," which claims priority to International Application No. PCT/SG2017/050301 filed with the Intellectual Property Office of Singapore on Jun. 14, 2017, each of which is incorporated herein by reference in their entirety for all purposes.

FIELD

This invention relates to a pole for supporting lighting fixtures and other devices.

BACKGROUND

Poles are traditionally used to raise lighting fixtures for illuminating roads and walkways. In smart city infrastructure and the Internet of Things (IoT), poles used for lighting may also conveniently be used as supports or attachment points for cameras, sensors and other information and communication technology (ICT) devices that may be used to implement various functions of the smart city and inter-networking of physical devices. Currently, providing ICT devices as part of smart city infrastructure is performed on an ad-hoc basis where each device is mounted onto an existing light pole or street sign pole and connected individually, resulting in an aesthetically unpleasant finish as well as being labour intensive and time consuming to perform.

SUMMARY

According to a first aspect, there is provided a pole for supporting at least one light fixture and at least one information and communication device thereon, the pole comprising: an elongate structural core to support weight of the pole; and an elongate external covering housing at least an upper portion of the structural core therein; the structural core defining a plural number of channels within the external covering to separate electrical wiring provided in each of the number channels.

The external covering may comprise at least two longitudinally connected elongate panels.

The external covering may comprise internal guides to engage the structural core. The internal guides may comprise longitudinal ribs projecting from an inner surface of the external covering.

The pole may further comprise a base, the base comprising a base plate having a central through hole for passing cabling therethrough, the base plate configured to be secured to a site where the pole is installed; the base further comprising an upstanding hollow central column provided on the base plate, a bottom portion of the structural core received in the central column.

The base may further comprise a casing provided around and spaced apart from the central column.

The base may further comprise radial ribs extending from the central column to support the casing, wherein the casing contacts free longitudinal edges of the radial ribs such that the radial ribs and the casing together define a number of separate chambers, the number of chambers being equal to the number of radial ribs.

A top end of each of the radial ribs may extend above a top end of the central column.

An inner edge at the top end of each of the radial ribs may be connected to a central hollow tube, the central hollow tube having an internal cavity large enough for passage of the structural core therethrough, a bottom end of the central hollow tube being spaced apart from the top end of the central column.

A bottom end of the external covering may rest on the top end of each of the radial ribs.

The casing may comprise a plurality of separate sections each having upstanding side edges engaging the free longitudinal edges of the radial ribs.

The upstanding side edges of the sections may slideably engage the free longitudinal edges of the radial ribs and the pole may further comprise hinged flaps provided around the external covering at a top end of the casing, wherein lifting one of the flaps allows a corresponding one of the sections of the casing to be raised and thereby create an opening between a bottom edge of the section and the base for access to a corresponding one of the chambers.

Each of the hinged flaps may be lockable to prevent unauthorized access to each of the chambers.

The structural core may comprise a number of longitudinally connected elongate plates.

The structural core may comprise two L-beams, a first two of the number of plates defined by a first of the two L-beams and a second two of the number of plates defined by a second of the two L-beams, the structural core having a cross-shaped cross-section.

The structural core may comprise three of the plates, the structural core having a T-shaped or a Y-shaped cross-section.

The structural core may comprise an I-beam, a web of the I-beam and two flanges of the I-beam defining the longitudinally connected elongate plates.

The I-beam may be formed by two U-shaped or C-shaped channels connected back to back.

The external covering may comprise an longitudinal slot provided along its length to slideably and securably engage an arm of the at least one light fixture.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIG. 14 is an exploded assembly view of the external covering of FIG. 13 with the structural core of FIG. 11a.

DETAILED DESCRIPTION

Exemplary embodiments of a pole 100 for supporting lighting fixtures and other devices will be described below with reference to FIGS. 1 to 17. The same reference numerals are used in the different figures to denote the same or similar parts.

In general, the pole 100 comprises an elongate external covering 10 housing at least an upper portion of an elongate structural core 20 therein. The structural core 20 is preferably made of structural steel to serve as a structural element for bearing load of the pole 100 and anything else that may be provided on the pole 100, such as one or more lighting fixtures and other ICT devices.

Figure 1A:
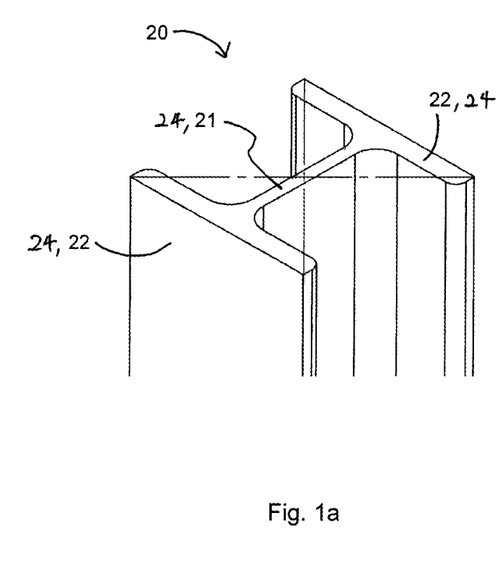
FIG. 1a is a perspective view of a first exemplary embodiment of a structural core of an exemplary pole.
Figure 1B:
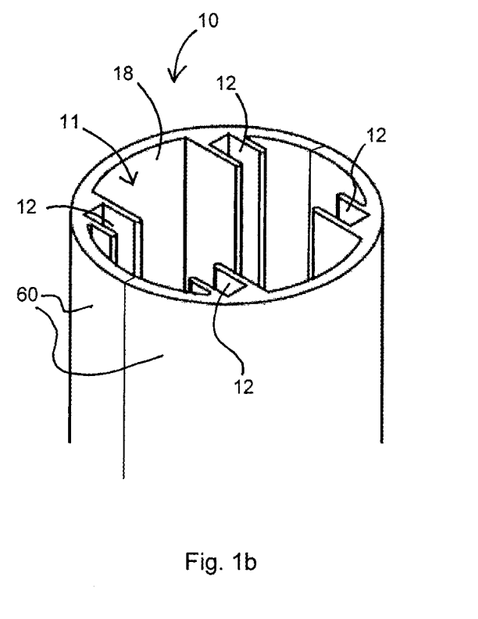
FIG. 1b is a perspective view of an exemplary external covering of the exemplary pole.

The external covering 10 in general defines an elongate space 11, as shown in FIG. 1b, in which the structural core 20 as well as wiring (not shown) that may comprise electrical cabling and data cabling are housed. Electrical cabling is provided to power light fixtures (not shown) on the pole 100, while data cabling may be provided to connect ICT devices (not shown) on the pole 100 with a smart city or other desired network.

The elongate space 11 defined by the external covering 10 is separated into a plural number of channels 40 by the structural core 20 housed in the external covering 10. The number of channels 40 provided in the pole 100 is determined by the cross-sectional shape of the structural core 20, as will be described in greater detail below.

Figure 9:
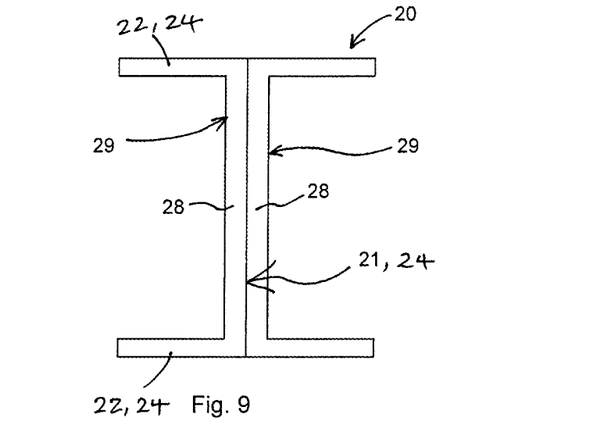
FIG. 9 is a cross-sectional view of an alternative embodiment of the structural core comprising two U-shaped or C-shaped channels arranged back to back.

The structural core 20 comprises a number of longitudinally connected elongate plates 24 that define a plural number of channels 40 in the external covering 10. In an exemplary embodiment as shown in FIG. 1a, the structural core 20 may comprise an I-beam 20 comprising a vertical web 21 disposed between two parallel and spaced-apart horizontal flanges 22 to define an I-shaped cross-section. For the avoidance of doubt, an I-beam is also known as an H-beam, Universal Beam (UB), or Rolled Steel Joist (RSJ) and the term "I-beam" is thus understood to also refer to such. In the exemplary embodiment of FIG. 1a where the structural core 20 comprises an I-beam 20, it can be seen that the I-beam is formed of three longitudinally connected elongate plates 24, wherein the three elongate plates 24 of the I-beam comprise the vertical web 21 and the two horizontal flanges 22. It should be noted that in the present application, the term "I-beam" also refers to two U-shaped or C-shaped channels 29 connected back to back as shown in FIG. 9, so that the two U-shaped or C-shaped channels 29 together effectively form an I-beam where the backs 28 of each of the two U-shaped or C-shaped channels 29 together define the vertical web 21 of the I-beam 20.

Figure 16:
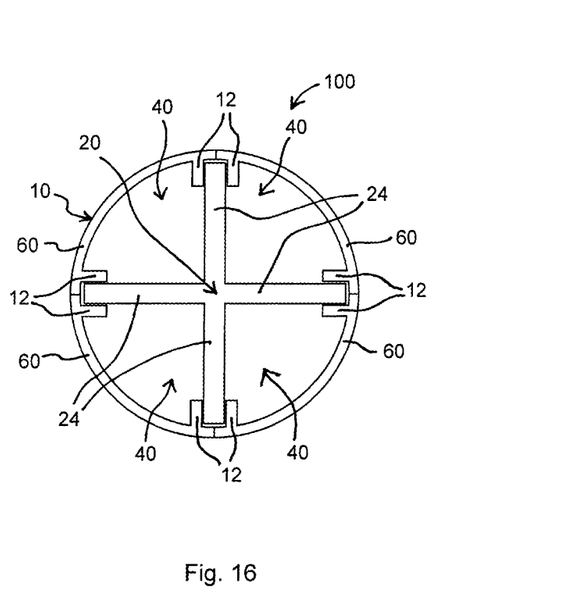
FIG. 16 is a schematic cross-sectional view of another exemplary embodiment of the pole comprising the external covering housing the structural core comprising a number of elongate plates defining an equal number of channels.

In another example of the structural core 20 as shown in FIG. 16, the structural core 20 comprises four longitudinally connected and radially arranged plates 24 defining a cross-shaped cross-section defining four channels 40 within the external covering 10. The number of plates 24 is not confined to four and may be any desired number from three or more to form the desired number of channels 40 in the pole 100.

Figure 11A:
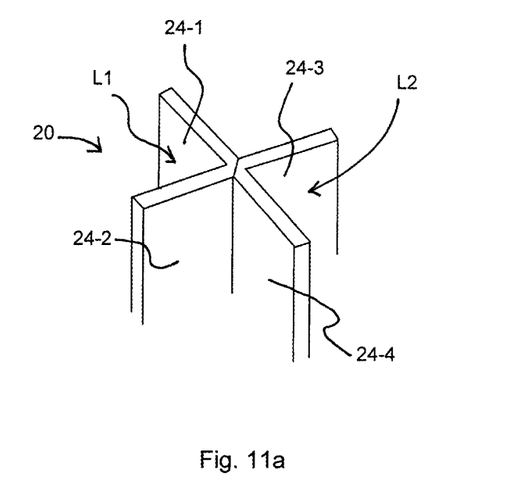
FIG. 11a is a perspective view of an alternative embodiment of the structural core comprising two L-beams.
Figure 11B:
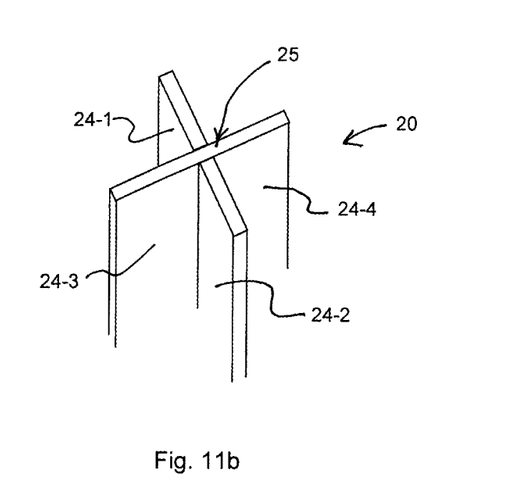
FIG. 11b is a perspective view of an alternative embodiment of the structural core having a cross-shaped cross-section.

Appreciably, the elongate plates 24 forming the structural core 20 may be longitudinally connected in a number of different ways. For example, as shown in FIG. 11a, the structural core 20 may comprise two L-beams L1, L2 that are longitudinally connected along their angled bends. A first two 24-1, 24-2 of the number of plates 24 are provided by the first L-beam L1 and a second two 24-3, 24-4 of the number of plates 24 are provided by the second L-beam L2, so that the structural core 20 has a cross-shaped cross-section comprising four radially arranged elongate plates 24-1, 24-2, 24-3, 24-4. Alternatively, as shown in FIG. 11b, the structural core 20 may be configured to have a similar cross-shaped cross-section comprising four radially arranged elongate plates 24 by connecting two elongate plates 24-1, 24-2 onto the centre of each side of a wider central plate 25, so that the central plate 25 is divided into two and forms the remaining two plates 24-3, 24-4 that form the cross-shaped cross-section.

Figure 12A:
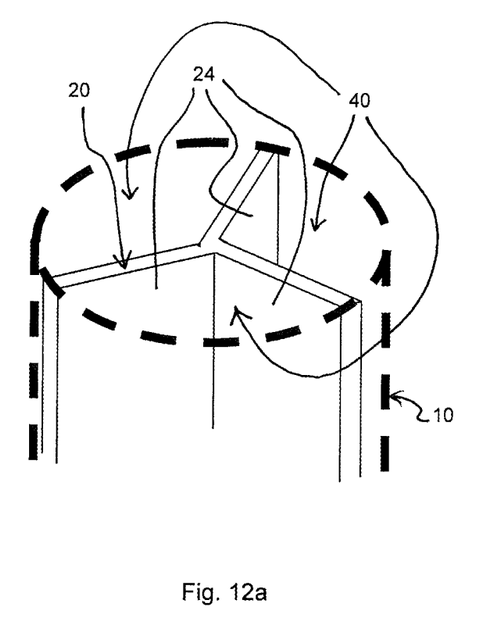
FIG. 12a is a perspective view of an alternative embodiment of the structural core having a Y-shaped cross-section.
Figure 12B:
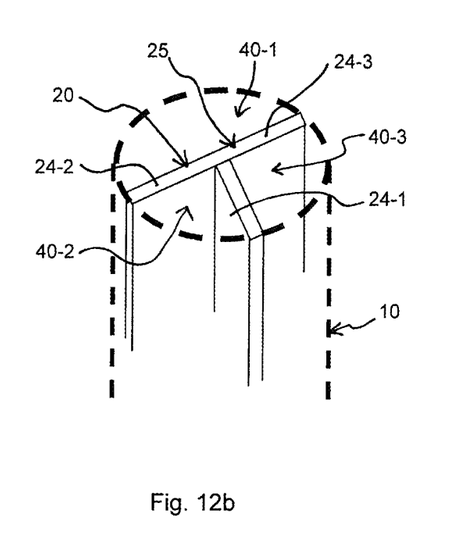
FIG. 12b is a perspective view of an alternative embodiment of the structural core having a T-shaped cross-section.

In another alternative configuration of the structural core 20 as shown in FIG. 12a, the structural core 20 comprises three plates 24 longitudinally connected to form a Y-shaped cross-section defining three channels 40 in the pole 100 when assembled with the external covering 10. Further alternatively, a structural core 20 having a T-shaped cross-section as shown in FIG. 12b may be formed by orthogonally connecting a first plate 24-1 onto a wider plate 25 that defines two further plates 24-2, 24-3 on each side of the first plate 24-1. In this way, the structural core 20 defines three channels 40-1, 40-2, 40-3 within the external covering 10 (shown schematically in dotted lines), in which one of the channels 40-1 is larger than the other two channels 40-2, 40-3.

Figure 17:
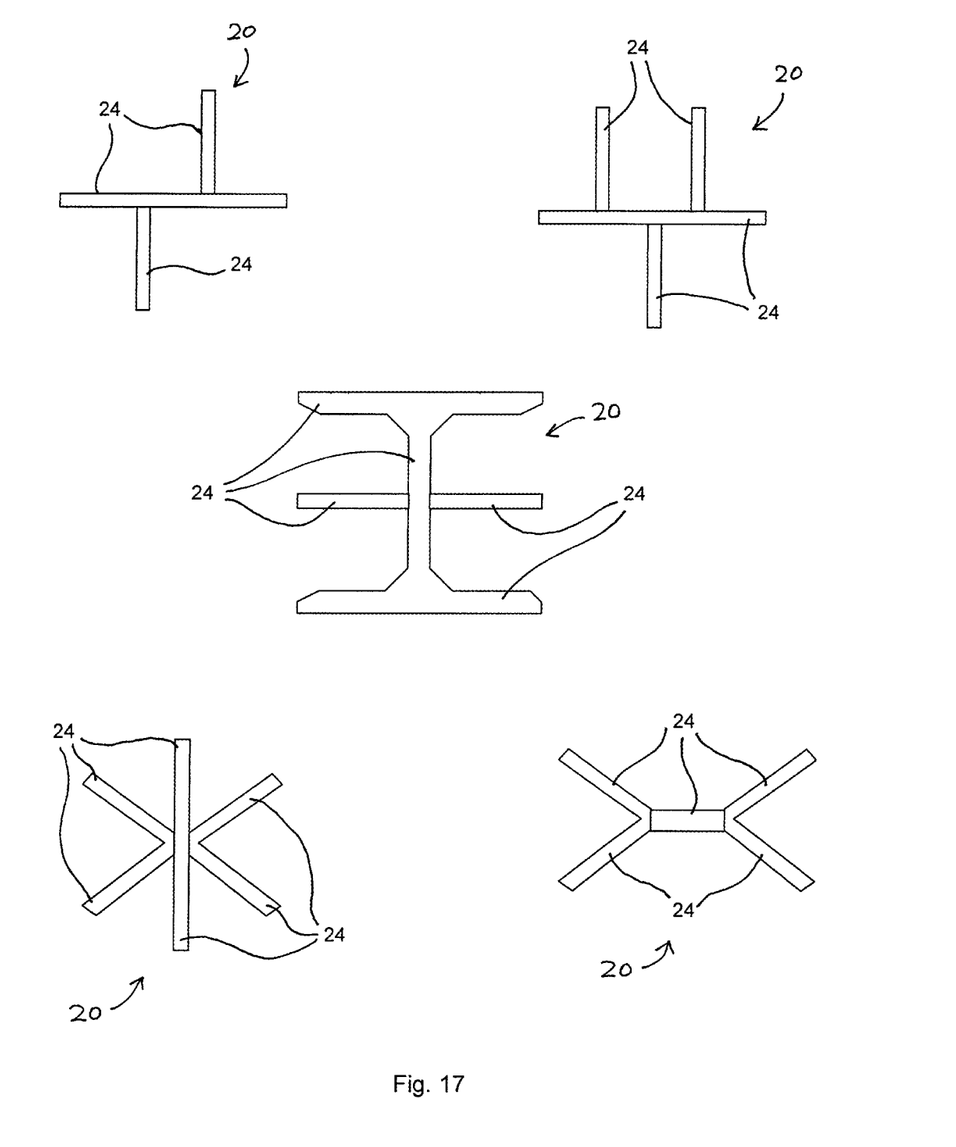
FIG. 17 shows schematic cross-sectional views of various other alternative embodiments of the structural core.

Thus, it can be seen that using any appropriate number and combination of readily available parts such as I-beams, L-beams, elongate flat rectangles and so on, any conceivable configuration of the structural core 20 may be formed in order to define the plural number of channels 40 in the external covering 10. FIG. 17 shows further exemplary alternative embodiments of the structural core 20 formed using a variety of different parts.

Figure 2:
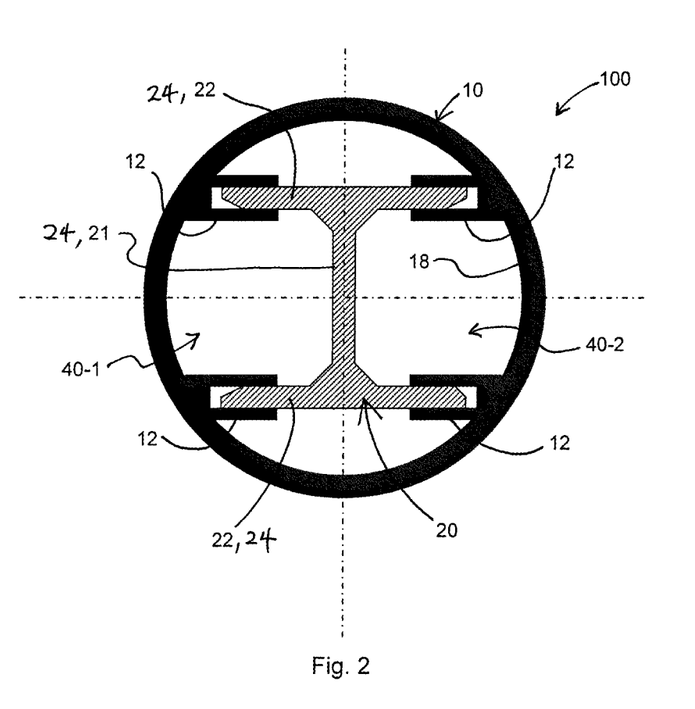
FIG. 2 is a cross-sectional view of a first exemplary embodiment of the pole.

In an exemplary embodiment of the pole 100 shown in FIG. 2, in which the structural element 20 comprises an I-beam 20, the elongate space 11 is separated into two channels 40-1, 40-2 by at least the web 21 of the I-beam 20. The first channel 40-1 and the second channel 40-2 may be identical. The first and second channels 40-1, 40-2 allow electrical cabling and data cabling to be separately housed in different channels 40-1, 40-2 within the pole 100. Cables in the first channel 40-1 are electromagnetically shielded from cables in the second channel 40-2 by the web 21 of the I-beam 20. In this way, interference is minimized between electrical and data cabling that are simultaneously provided within the pole 100. This allows the exterior of the pole 100 to be cable-free even when ICT devices such as cameras or sensors are provided on the pole 100, as the cabling for such ICT devices can be enclosed in the pole 100 together with electrical cabling for the lighting fixtures without experiencing electromagnetic interference since the data cabling is provided within one the channels 40-1, 40-2 while electrical cabling is provided within the other of the channels 40-1, 40-2.

Figure 13:
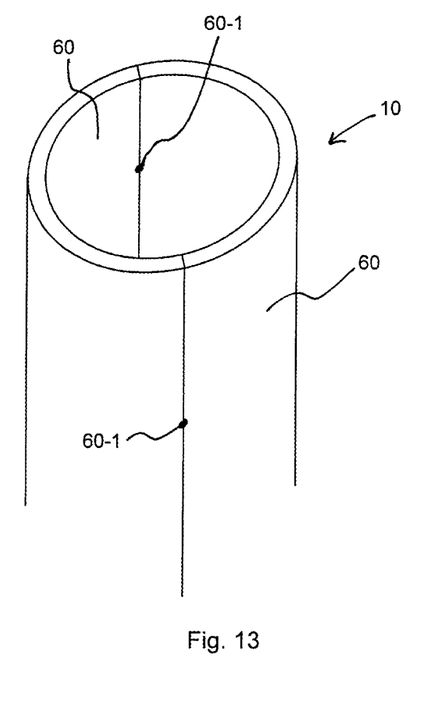
FIG. 13 is a perspective view of an exemplary embodiment of the external covering of the pole comprising a number of elongate panels.

The external covering 10 preferably comprises a number of longitudinally connected elongate panels 60 that are assembled to define a hollow cross-section to house the structural core 20 therein. In exemplary embodiments as shown in FIGS. 1b and 13, the external covering 10 may comprise two curved panels 60 that each has a generally C-shaped cross-section to define a generally cylindrical external covering 10. It should be understood that the number of panels 60 may be two or more, and each panel 60 may be of any appropriate shape and size to enclose the structural core 20 therein when the panels 60 have been assembled together to form the external covering 10 of a desired exterior shape. For example, the panels 60 may alternatively have L-shaped cross-sections (not shown).

The panels 60 may be made of one or more appropriate materials, such as aluminium, steel, or polycarbonate where transparency may be desired. The panels 60 forming the external covering 10 may or may not be identical or similar in shape or size with one another. In some embodiments, as shown in FIG. 16, the number of panels 60 may correspond with the number of channels 40 provided in the pole 100 by configuring the panels 60 to be assembled around the structural core 20 such that each panel 60 is aligned with one channel 40. In this way, each of the number of channels 40 may be readily and individually accessed by removing an appropriate one of the number of panels 60 forming the external covering 10.

Connection of the longitudinal edges 60-1 of the panels 60 may be achieved using any appropriate known means (not shown), such as snap fit attachments, draw bolt latches, screw plates and so on. Preferably, connection of the panels 60 of the external covering is configured to be releasable after assembly to allow for easy maintenance and reconfiguration of the pole 100 for different uses after installation.

Figure 14:
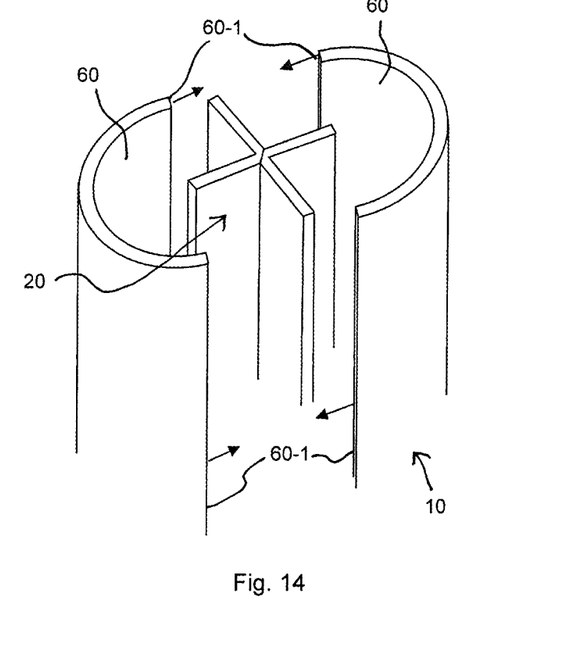

By providing the external covering 10 as a number of separate panels 60, the pole 100 is readily assembled by laterally connecting the longitudinal edges 60-1 of the panels 60 around the erected structural core 20 as shown in FIG. 14, thereby enclosing the structural core 20 within the external covering 10. This is a significantly easier method of assembling the pole compared to providing the external covering as an enclosed tube that must be raised until its bottom end is above a top end of the erected structural core in order for the external covering to be fitted over the structural core. Nevertheless, the external covering 10 may also be provided as a single tubular structure if so desired.

Figure 3:
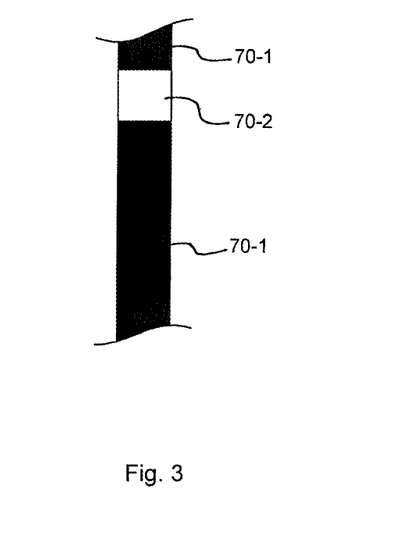
FIG. 3 is a side view of another exemplary embodiment of the pole.

In some embodiments, the pole 100 may comprise multiple sections 70 where the external covering 10 is made of different materials along its length. For example, as shown in FIG. 3, the external covering 10 may comprise opaque aluminium sections 70-1 as well as a transparent polycarbonate section 70-2 where transparency is required to house a camera or other light receiving device (not shown) within one of the channels 40 of the pole 100. Where the external covering 10 is also formed of multiple panels 60 as described above, it will be understood that panels 60 of different materials used to form the different sections 70 will also be connected at their short edges in order to form the required length of external covering 10 of the pole 100, in addition to being connected at their longitudinal edges to other panels 60 of the external covering 10 to surround the structural core 20.

When the pole 100 is assembled, the external covering 10 preferably has a generally closed external cross-sectional shape to prevent wiring in the channels 40 from being exposed to the elements. The exemplary embodiment in FIGS. 1b and 2 show the external covering 10 having a circular cross-section which presents the pole 100 as a cylinder. The external covering 10 may have an external cross-section of any other shape as may be desired, such as a rounded square, rounded rectangle, hexagon, and so on, as long as the elongate space 11 defined by the external covering 10 is of a sufficient size to house the structural core 20 and the desired wiring within the external covering 10.

Figure 15:
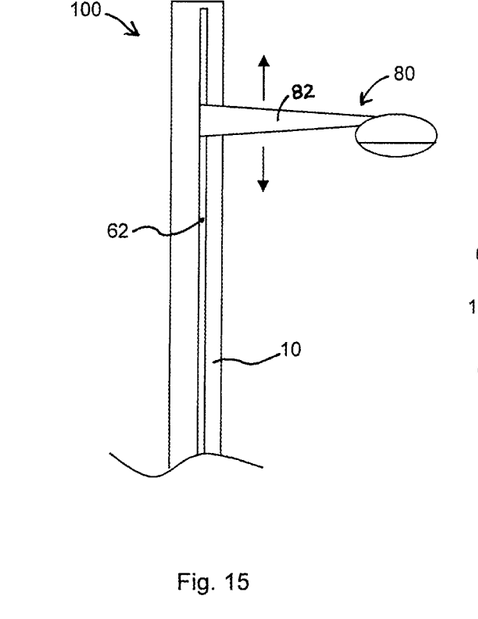
FIG. 15 is a schematic side view illustration of an exemplary embodiment of the external covering of the pole comprising a longitudinal slot provided to slideably and securably engage a lighting fixture.

As shown in FIG. 15, in some embodiments, the external covering 10 may additionally be configured to comprise at least one longitudinal slot 62 provided along its length. By configuring the longitudinal slot 62 to slideably and securably engage an arm 82 of the light fixture 80, easy raising and lowering of a light fixture 80 supported by the pole 100 (as indicated by the arrows) can be achieved for maintenance of the light fixture 80.

Figure 4:
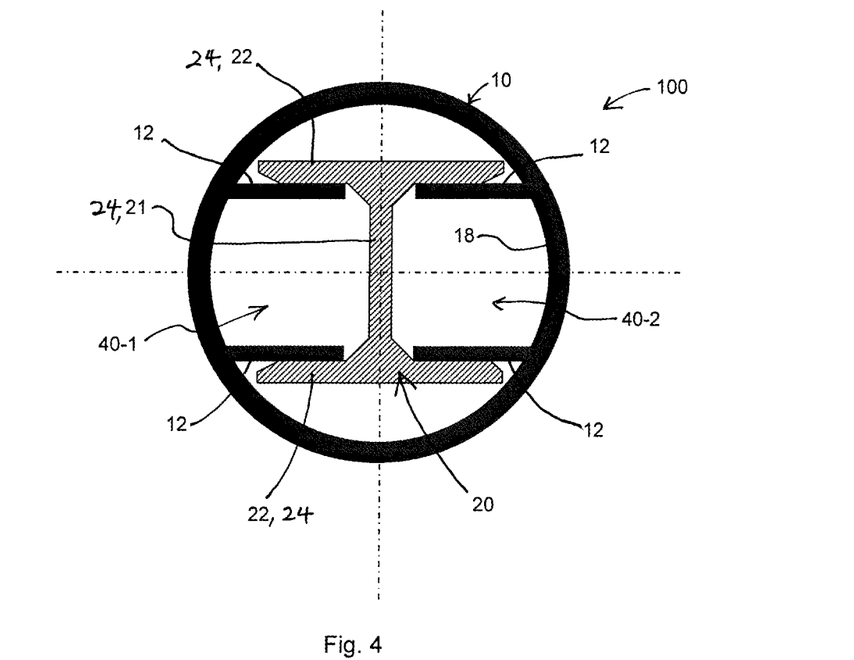
FIG. 4 is a cross-sectional view of another exemplary embodiment of the external covering.
Figure 5:
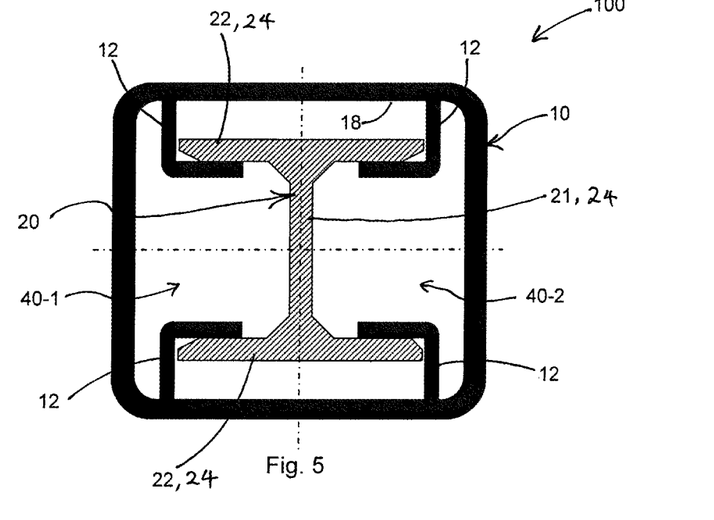
FIG. 5 is a cross-sectional view of a further exemplary embodiment of the external covering.

In some embodiments, the external covering 10 may further comprise internal guides 12 to engage the structural core 20. As can be seen in FIGS. 2, 4, 5, and 16, lateral longitudinal edges of at least some the elongate plates 24 of the structural core 20 are engaged by the internal guides 12. The internal guides 12 help to secure the external covering 10 to the structural core 20 and to prevent movement of the external covering 10 relative to the structural core 20 when the external covering 10 and the structural core 20 have been assembled together. The internal guides 12 preferably comprise longitudinal ribs projecting from an inner surface 18 of the external covering 10. The internal guides 12 are preferably integral with the external covering 10, being likewise extruded, and may be of any appropriate size and shape to engage the lateral longitudinal edges of at least some of the elongate plates 24 of the structural core 20. FIGS. 4 and 5 show different exemplary embodiments of the internal guides 12 and the wall 19 of the external covering 10. For example, the internal guides 12 may comprise at least one straight rib to engage at least one side of a longitudinal edge of an elongate plate 24 of the structural core 20 as shown in FIGS. 2, 4 and 16, or the internal guides 12 may comprise L-shaped ribs each provided to engage one side of an elongate plate 24 of the structural core 20 as shown in FIG. 5.

Figure 6:
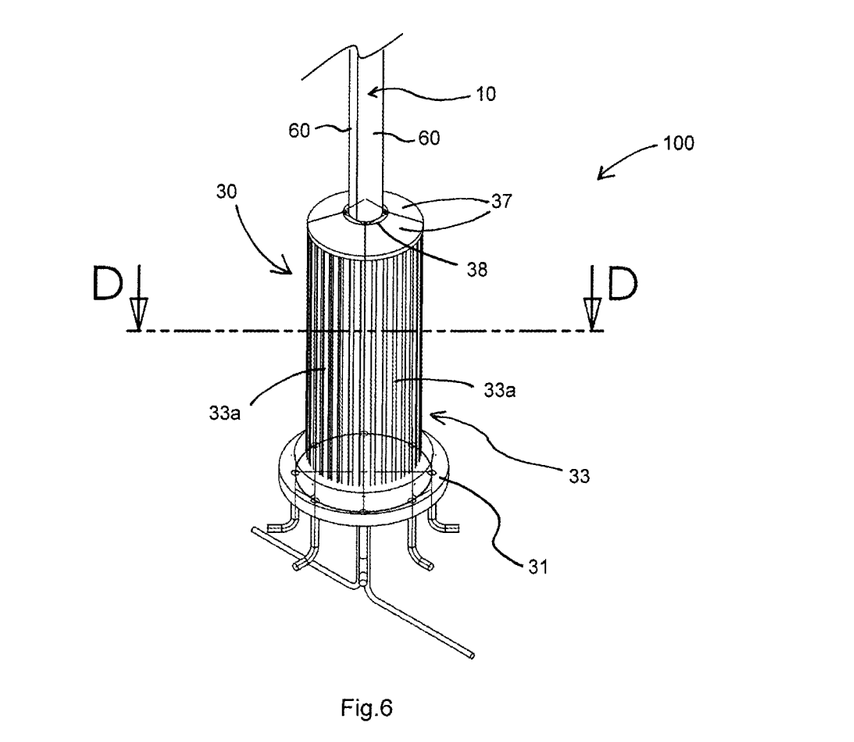
FIG. 6 is a perspective view of an exemplary embodiment of the pole.
Figure 7:
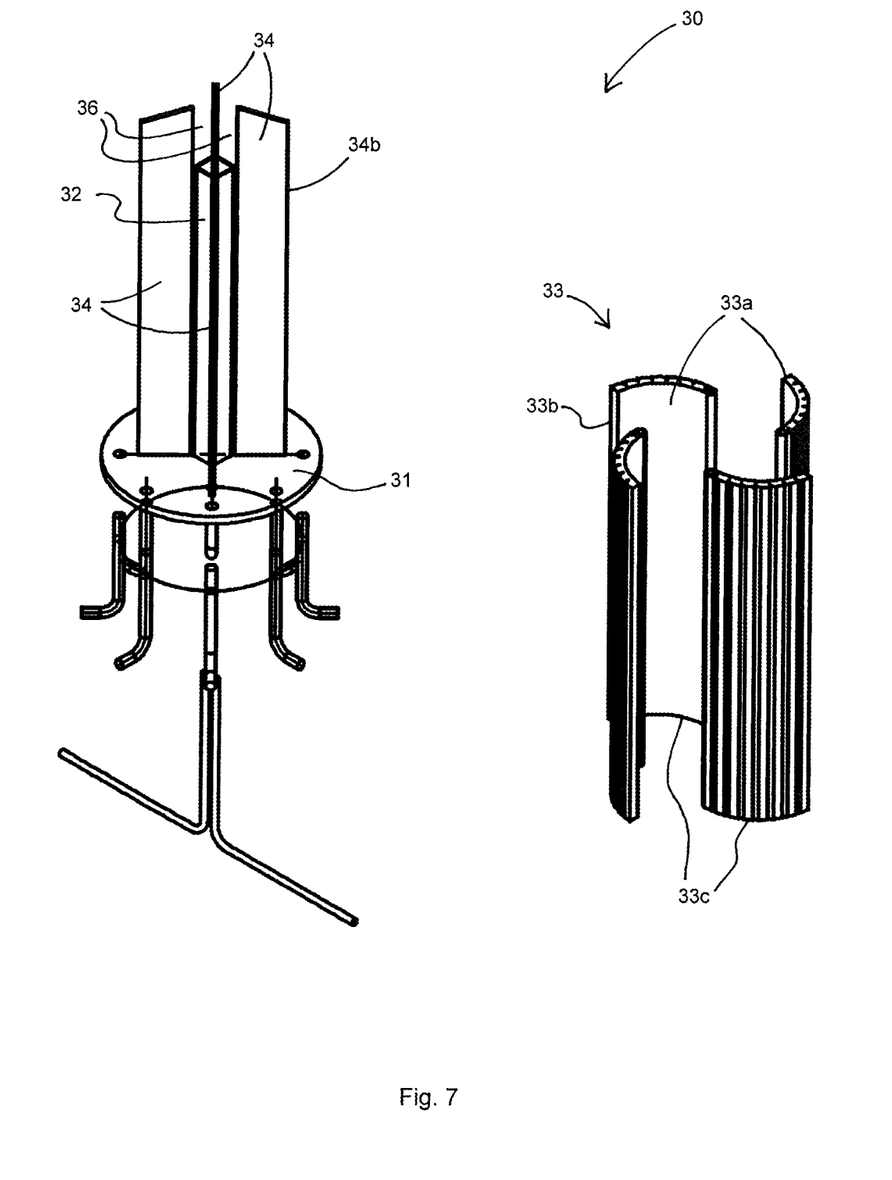
FIG. 7 is an exploded assembly view of a base of the pole of FIG. 6.
Figure 8:
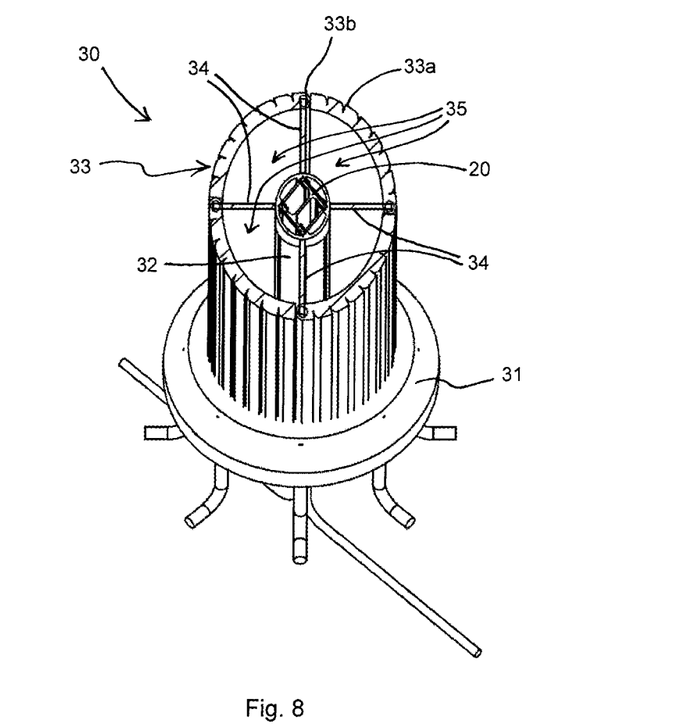
FIG. 8 is an oblique cross-sectional view of a base portion of the pole of FIG. 6 through D-D.

The pole 100 preferably further comprises a base 30 as shown in FIGS. 6 to 8. The base 30 provides structural rigidity and support to the pole 100 and is configured to be secured to the site where the pole 100 is installed. The base 30 comprises a base plate 31 provided at a bottom of the base 30. The base plate 31 has a central through hole for passing wiring therethrough from under the base 30. The base plate 31 is preferably made of steel.

The base 30 also comprises an upstanding hollow central column 32 provided on the base plate 31. The central column 32 is preferably also made of steel. The central column 32 is preferably integral with the base plate 31, and may be welded to the base plate 31. The central column 32 is hollow to allow passage of cabling therethrough and to receive a bottom portion of the structural core 20 therein to keep the structural core 20 upright. In an exemplary embodiment, the central column 32 may have a length of about 1 m when the structural core 20 has a length of about 6 m, so that about one-sixth of the structural core 20 is supported in the central column 32. The central column 32 preferably has a cross-sectional shape that is a rectangle or rounded rectangle, having an internal cavity sized and shaped to receive the structural core 20 with a clearance fit. Alternatively, the central column 32 may have a circular cross-sectional shape or any other cross-sectional shape that can suitably accommodate the structural core 20 therein.

The base 30 may further comprise a casing 33 provided around and spaced apart from the central column 32 to enclose circuitry (not shown) provided in the base 30 as well as for aesthetic purposes. The casing 33 may be made of any appropriate material, for example, aluminium, steel, or a UV resistant polyethylene.

In an exemplary embodiment, the base 30 further comprises radial ribs 34 extending from the central column 32 to support the casing 33 as well as the external covering 10. An inner edge of each of the ribs 34 may be welded to the central column 32 and a bottom end of each rib 34 may be welded to the base plate 31. The ribs 34 are preferably equally angled apart from each other about the central column 32. The casing 33 contacts free longitudinal edges 34b of the ribs 34, so that the ribs 34 and the casing 33 together define a number of separate chambers 35 within the base 30. The separate chambers 35 allow separate sets of circuitry to be simultaneously housed in the base 30 in each of the separate chambers 35 respectively without interference with one another. The number of chambers 35 in the base 30 is equal to the number of ribs 34. At least two ribs 34 may be provided, preferably three or more.

A top end of each rib 34 preferably extends above a top end of the central column 32 so that when the structural core 20 has been received in the central column 32 and the external covering 10 is assembled around the structural core 20, a bottom end of the external covering 10 rests on the top ends of the ribs 34, exposing a section of the structural core 20 below the bottom end of the external covering 10 in gaps 36 formed between the top end of the ribs 34 and the top end of the central column 32. In this way, bottom ends of the channels 40 in the pole 100 are open and accessible via the gaps 36. Cabling that passes through the base plate 31 and the central column 32 into the channels 40 may be accessed through the gaps 36 for connection to circuitry provided in the chambers 35 of the base 30.

Figure 10:
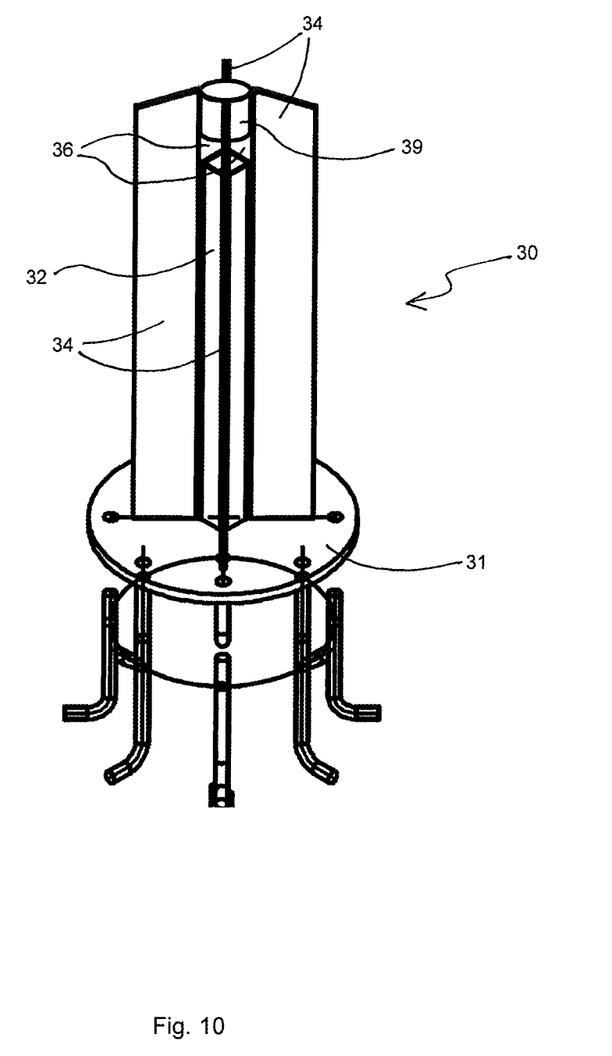
FIG. 10 is a perspective view of an alternative embodiment of a base of the pole not showing the casing.

In one embodiment of the base 30, as shown in FIG. 7, the top end of each rib 34 may be isolated from the other ribs. In an alternative embodiment of the base 30 as shown in FIG. 10 (casing 33 not shown), an inner edge at the top end of each rib 34 may be connected to a central hollow tube 39. The central hollow tube is preferably coaxial with the central column 32. The central hollow tube 39 has an internal cavity that is large enough for passage of the structural core 20 therethrough. A bottom end of the central hollow tube 39 is spaced apart from the top end of the central column 32 so that the gaps 36 for passage of cabling therethrough are provided below the bottom end of the central hollow tube 39. The central hollow tube 39 provides additional strength and rigidity to the ribs 34 for supporting the external covering 10 thereon. The central hollow tube 39 may have a circular cross-sectional shape or any other cross-sectional shape to allow passage of the structural core 20 therethrough and to support the external covering 10 thereon.

The casing 33 may be provided as a plurality of separate sections 33a each having upstanding side edges 33b that engage the free longitudinal edges 34b of the ribs 34, as shown in FIG. 8. In an exemplary embodiment, the upstanding side edges 33b slideably engage the free longitudinal edges 34b of the ribs 34 while at a top end of the casing 33, hinged flaps 37 may be provided around the external covering 10, as shown in FIG. 6. The hinged flaps 37 preferably pivot about hinges 38 having horizontal axes adjacent the external covering 10, so that each flap 36 may be lifted to allow a section 33a of the casing 33 to be raised. Raising a section 33a of the casing 33 creates an opening between a bottom edge 33c of the section 33a and the base plate 31, thereby gaining access to circuitry provided in a chamber 35 of the base 30.

As the pole 100 is configured to support lighting fixtures as well as ICT devices, it will be appreciated that different organizations may be involved with the installation and maintenance of the different fixtures and devices provided on the pole. Accordingly, each of the hinged flaps 38 may be configured to be lockable so that its corresponding chamber 35 is accessible to only the relevant organization that is responsible for that particular fixture or device that has circuitry and other components stored in that particular chamber 35. In this way, unauthorized access can be prevented to minimize tampering and accidental damage to the components and circuitry stored in the base 30 of the pole 100.

Alternatively, the upstanding side edges 33b of the separate sections 33a of the casing 33 may be releasably connected to the free longitudinal edges 34b of the radial ribs 34 via fittings (not shown) such as snap fit attachments, screw plates, draw bolt latches and so on, in order to allow the sections 33a to be individually removed for access to the chambers 35. Further alternatively or additionally, the separate sections 33a may be hinged at their longitudinal edges to the longitudinal edges 34b of the radial ribs 34 in order for each section 33a to function as an openable door to access the chambers 35.

Whilst there has been described in the foregoing description exemplary embodiments of the present invention, it will be understood by those skilled in the technology concerned that many variations and combination in details of design, construction and/or operation may be made without departing from the present invention. For example, features that may be described for some embodiments may be incorporated into other embodiments and the different features described for the different embodiments may be combined in different ways to form yet other embodiments of the pole.

The invention claimed is:

1. A pole for supporting at least one light fixture and at least one information and communication device thereon, the pole comprising:
    an elongate structural core to support weight of the pole;
    an elongate external covering housing at least an upper portion of the structural core therein; the structural core defining a plural number of channels within the external covering to separate electrical wiring provided in each of the number channels;

the pole further comprising a base, the base comprising
a base plate having a central through hole for passing cabling therethrough, the base plate configured to be secured to a site where the pole is installed; and
an upstanding hollow central column provided on the base plate, a bottom portion of the structural core received in the central column,
wherein the base further comprises a casing provided around and spaced apart from the central column.

2. The pole of claim 1, wherein the external covering comprises at least two longitudinally connected elongate panels.

3. The pole of claim 1, wherein the external covering comprises internal guides to engage the structural core.

4. The pole of claim 3, wherein the internal guides comprise longitudinal ribs projecting from an inner surface of the external covering.

5. The pole of claim 1, wherein the base further comprises radial ribs extending from the central column to support the casing, wherein the casing contacts free longitudinal edges of the radial ribs such that the radial ribs and the casing together define a number of separate chambers, the number of chambers being equal to the number of radial ribs.

6. The pole of claim 5, wherein a top end of each of the radial ribs extends above a top end of the central column.

7. The pole of claim 6, wherein an inner edge at the top end of each of the radial ribs is connected to a central hollow tube, the central hollow tube having an internal cavity large enough for passage of the structural core therethrough, a bottom end of the central hollow tube being spaced apart from the top end of the central column.

8. The pole of claim 6, wherein a bottom end of the external covering rests on the top end of each of the radial ribs.

9. The pole of claim 5, wherein the casing comprises a plurality of separate sections each having upstanding side edges engaging the free longitudinal edges of the radial ribs.

10. The pole of claim 9, wherein the upstanding side edges of the sections slideably engage the free longitudinal edges of the radial ribs and wherein the pole further comprising hinged flaps provided around the external covering at a top end of the casing, wherein lifting one of the flaps allows a corresponding one of the sections of the casing to be raised and thereby create an opening between a bottom edge of the section and the base for access to a corresponding one of the chambers.

11. The pole of claim 10, wherein each of the hinged flaps is lockable to prevent unauthorized access to each of the chambers.

12. The pole of claim 1, wherein the structural core comprises a number of longitudinally connected elongate plates.

13. The pole of claim 12, wherein the structural core comprises two L-beams, a first two of the number of plates defined by a first of the two L-beams and a second two of the number of plates defined by a second of the two L-beams, the structural core having a cross-shaped cross-section.

14. The pole of claim 12, wherein the structural core comprises three of the plates, the structural core having a T-shaped or a Y-shaped cross-section.

15. The pole of claim 12, wherein the structural core comprises an I-beam, a web of the I-beam and two flanges of the I-beam defining the longitudinally connected elongate plates.

16. The pole of claim 15, wherein the I-beam is formed by two U-shaped or C-shaped channels connected back to back.

17. The pole of claim 1, wherein the external covering comprises a longitudinal slot provided along its length to slideably and securably engage an arm of the at least one light fixture.

* * * * *